(12) United States Patent
Gerrese et al.

(10) Patent No.: US 11,838,619 B2
(45) Date of Patent: Dec. 5, 2023

(54) IDENTIFYING PHOTOGENIC LOCATIONS ON AUTONOMOUS VEHICLE ROUTES

(71) Applicant: GM Cruise Holdings LLC, San Francisco, CA (US)

(72) Inventors: Alexander Willem Gerrese, San Francisco, CA (US); Jeremy Stephen Juel, San Francisco, CA (US); Katherine Mary Stumpf, San Francisco, CA (US); Andrew David Acosta, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 248 days.

(21) Appl. No.: 17/322,663

(22) Filed: May 17, 2021

(65) Prior Publication Data
US 2022/0368826 A1    Nov. 17, 2022

(51) Int. Cl.
| | | |
|---|---|---|
| *H04N 23/60* | (2023.01) | |
| *G01C 21/34* | (2006.01) | |
| *B60W 60/00* | (2020.01) | |
| *G06K 7/14* | (2006.01) | |
| *G06K 19/06* | (2006.01) | |
| *G06F 16/53* | (2019.01) | |
| *B60W 50/14* | (2020.01) | |
| *H04N 23/90* | (2023.01) | |

(52) U.S. Cl.
CPC ............ *H04N 23/64* (2023.01); *B60W 50/14* (2013.01); *B60W 60/001* (2020.02); *G01C 21/3415* (2013.01); *G01C 21/3476* (2013.01); *G06F 16/53* (2019.01); *G06K 7/1417* (2013.01); *G06K 19/06037* (2013.01); *H04N 23/90* (2023.01); *B60W 2420/42* (2013.01); *B60W 2420/54* (2013.01); *H04R 2499/13* (2013.01)

(58) Field of Classification Search
CPC ............ B60W 60/001; G01C 21/3415; G01C 21/3476; H04N 7/188; H04N 23/64
See application file for complete search history.

(56) References Cited

U.S. PATENT DOCUMENTS

| | | | |
|---|---|---|---|
| 10,685,240 B2* | 6/2020 | Oesterling | G01C 21/3848 |
| 11,308,175 B2* | 4/2022 | Lenke | G06F 16/9537 |
| 11,568,164 B2* | 1/2023 | Esquivel | G06Q 30/06 |
| 2017/0034110 A1* | 2/2017 | Bijor | H04L 67/12 |
| 2020/0097737 A1* | 3/2020 | Oesterling | G06T 3/4038 |
| 2020/0349666 A1* | 11/2020 | Hodge | G08G 1/017 |
| 2020/0410019 A1* | 12/2020 | Lenke | G06F 16/9535 |
| 2022/0366165 A1* | 11/2022 | Esquivel | G06K 17/0022 |

* cited by examiner

*Primary Examiner* — Boubacar Abdou Tchoussou
(74) *Attorney, Agent, or Firm* — Akona IP PC

(57) ABSTRACT

Systems and methods for generating images from an autonomous vehicle ride. Systems and methods are provided for determining whether a vehicle route passes a photogenic location and, if so, capturing an image at the photogenic location. The user can be provided with an option to take a detour to a nearby photogenic location. Additionally, a route can be selected based on one or more photogenic locations along the route. Captured images are provided to the user.

20 Claims, 8 Drawing Sheets

IDENTIFYING PHOTOGENIC LOCATIONS ON AUTONOMOUS VEHICLE ROUTES

CROSS REFERENCE TO RELATED APPLICATIONS

This Application is related to concurrently-filed application titled "Creating Highlight Reels of User Trips", which Application is incorporated herein by reference in its entirety into the disclosure of this application.

FIELD OF THE DISCLOSURE

The present disclosure relates generally to autonomous vehicles (AVs) and to systems and methods for capturing images during a trip.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations.

Passengers who ride in autonomous vehicles may generally use the vehicles to travel to a destination or complete an errand. Often, two or more passengers travel together in an autonomous vehicle to a planned event. A passenger can use any available rideshare service for these purposes, with potentially little difference in ride experience. Additionally, the ride itself can be boring for a passenger, such that the passenger considers the ride wasted time.

SUMMARY

Systems and methods are provided for experiences that make an autonomous vehicle ride more entertaining and memorable, and, by extension, for building a stronger brand relationship with users. The rideshare experience can be made more fun and social by leveraging the car's in-cabin and external sensors to capture a ride's most special moments. These include views along the route. In particular, photogenic views along a route can be captured and saved for the user. In some instances, a user is provided with an option to take a detour to a nearby photogenic location. In some examples, a user can select a route to pass by a selected photogenic location. Captured images are provided to the user, for example via a user rideshare account.

According to one aspect, a method for providing images from an autonomous vehicle ride comprises receiving a ride request from a user, generating a route based on ride request parameters; determining that the route passes a photogenic location, and identifying the photogenic location, determining whether a photo opportunity exists at the photogenic location, and capturing an image including the photogenic location when the vehicle drives by the photogenic location. According to some implementations, the method includes determining whether the route passes nearby any photogenic locations and presenting the user with an option to take a detour to a nearby photogenic location. According to some implementations, the method includes capturing a first user image inside the vehicle during the ride. According to some implementations, capturing an image includes capturing a plurality of images and the method includes selecting a subset of the plurality of images and generating a highlight reel of the ride including the subset.

According to another aspect, an autonomous vehicle for providing images from an autonomous vehicle ride comprises: an onboard computer configured to receive a route including a photogenic location, a sensor suite on the vehicle configured to capture a first set of images along the route, and a plurality of sensors inside the vehicle. The first set of images include the images of the photogenic location. At least one of the sensors inside the vehicle is configured to capture a second set of images during the ride, and the second set of images include views inside the vehicle at the photogenic location.

According to various implementations, the onboard computer is further configured to determine whether a photo opportunity exists at the photogenic location, based on data from the sensor suite. In some implementations, the autonomous vehicle includes a screen configured to display ones of the first and second sets of images during the ride. In some implementations, the screen is further configured to display a machine-readable code, wherein the machine-readable code is configured to link to the first and second sets of images. In some implementations, the autonomous vehicle includes a transmitter configured to transmit the first and second sets of images to a remote computer system. In some implementations, the plurality of sensors inside the vehicle includes a microphone configured to record an audio clip corresponding to a respective image from one of the first and second sets of images. In some implementations, at least one image from the first and second sets of images is a video clip.

According to another aspect, a system for capturing images during an autonomous vehicle ride comprises: a central computing system configured to receive a ride request, generate a route, and identify a photogenic location along the route; and an autonomous vehicle having a sensor suite configured to capture a first set of images during the ride, wherein the first set of images include images of the photogenic location. The central computing system is further configured to receive the first set of images and link the first set of images with a user account. In some implementations, the system includes a database of photogenic locations, wherein the central computing system is configured to use the database to identify photogenic locations along the route. In some implementations, the system includes a map including a map layer with photogenic locations from the database.

In some implementations, the autonomous vehicle is further configured to identify a new photogenic location, and transmit the new photogenic location to the central computing system, and wherein the central computing system is configured to update the database with the new photogenic location.

According to another aspect, a method for providing images from an autonomous vehicle ride comprises receiving a ride request from a user; generating a plurality of routes based on ride request parameters, wherein a first route of the plurality of routes passes a first photogenic location; receiving a user request for the first route; and capturing an image including the photogenic location when the vehicle drives by the photogenic location. In some implementations, the method includes determining whether the route passes nearby any other photogenic locations and presenting the user with an option to take a detour to a nearby photogenic location. In some implementations, a second route of the plurality of routes passes a second photogenic location and the method includes transmitting at least two route options to the user, wherein the route options include the first route and the first photogenic location and the second route and the second photogenic location.

According to another aspect, a method for updating map information, comprises collecting data from a plurality of autonomous vehicles, wherein the data includes a first set of photogenic locations; transmitting the data to a central computing system, wherein the central computing system includes a map and a database of photogenic locations; and generating a first layer of the map including the data.

According to another aspect, a method for providing photos from an autonomous vehicle ride comprises receiving approval for capturing images of a passenger, capturing a plurality of images during the ride, wherein the plurality of images includes at least one image of a view outside the vehicle, and transmitting at least a subset of the plurality of images to the passenger. In some implementations, capturing the plurality of images includes capturing at least one image of the passenger inside the vehicle. In some implementations, the method includes selecting a subset of the plurality of images and generating a highlight reel of the ride including the subset. In some implementations, transmitting includes transmitting the highlight reel to at least one of a data storage location, a message address, and a social media site.

According to another aspect, a system for capturing images during an autonomous vehicle ride comprises a sensor suite on the vehicle configured to capture a first set of images during the ride, wherein the first set of images include an image of a photogenic view outside the vehicle, a plurality of sensors inside the vehicle, wherein at least one of the sensors is configured to capture a second set of images during the ride, wherein the second set of images include views inside the vehicle, and an onboard computer configured to create a highlight reel including a subset of the first set of images and a subset of the second set of images. According to some implementations, the system includes a central computing system configured to receive the highlight reel from the onboard computer and save the highlight reel to a user account. In some implementations, the central computing system is configured to communicate with a user device via a rideshare application, and the highlight reel is viewable on the user device via the rideshare application.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Figure 1:
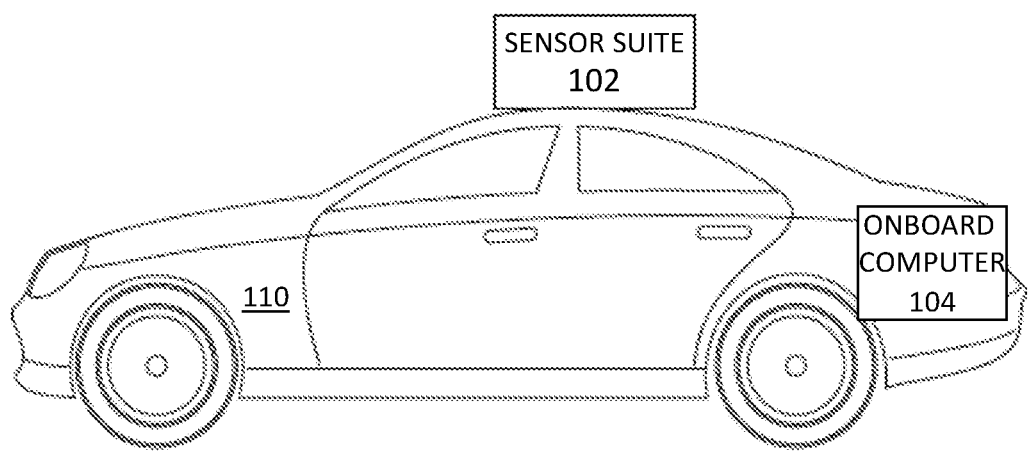
FIG. 1 is a diagram illustrating an autonomous vehicle, according to some embodiments of the disclosure.

Systems and methods are provided for experiences that make an autonomous vehicle ride more entertaining and memorable, and, by extension, build a stronger brand relationship with users. In particular, systems and methods are provided for capturing photos during a trip, and providing a photo or photo reel to a user. In some examples, the photos include images captured inside the vehicle with interior cameras. The images can be captured automatically or manually. In some examples, the photos include images captured outside the vehicle with exterior cameras. Images captured outside the vehicle can be captured while the vehicle is moving. Alternatively, the vehicle can stop to capture an image. In some examples, the vehicle stops to allow a user to capture an image, and in some examples, the vehicle stops and captures an image including the user with the exterior view as background. In various examples, the systems and methods provided herein can be used to capture any type of media, including one or more of images, audio, photos, video, stop-motion video, and visualizations of vehicle sensor data.

In general, a rideshare experience is transactional and utilitarian: a driver transports the passenger from point A to point B. This presents a difficulty for existing brands to build meaningful connections with their users. In addition, the actual trip experience for the passenger is unimaginative and often results in wasted time, which might be spent, for example, scrolling on social media until arrival at the destination. There is significant room for experiences that make the time during the autonomous vehicle ride more entertaining and memorable. Creating entertaining and memorable experiences for users has the additional potential benefit of building a stronger brand relationship with users. In some examples, the rideshare experience can be made more fun and social by leveraging the car's in-cabin and external sensors to capture a ride's most special moments in an easily shareable, highlight reel format. Machine learning can be used to automatically identify special moments during a ride. In some examples, an autonomous vehicle also provides a customizable manual photobooth experience.

When autonomous vehicle rideshare services enter the market, there is a need to establish user trust and loyalty. Thus, providing an experience that makes the ride more fun and memorable for passengers will help build a strong brand relationship while also encouraging social sharing that will enhance the rideshare service's media presence and trustworthiness. For example, a passenger's first ride in an autonomous vehicle can be a crucial point for capturing a long term customer, and providing an entertaining and memorable experience on a passenger's first ride along with photos and/or a highlight reel of the ride can help create a brand allegiance.

When riding in an autonomous vehicle, a lot of great moments happen both in and out of the vehicle. These moments might include seeing a sunset driving by an ocean beach or glimpsing a beautiful view of a city at the top of a hill. Inside the vehicle, the moments might include laughing with a group of friends, or enjoying a first autonomous vehicle trip together downtown. Some of these moments might be missed during a drive, or later forgotten. However, existing technology in an autonomous vehicle can be leveraged to capture moments for passengers. The captured moments can be combined to create a highlight reel including one or more trips. Providing the captured images and/or highlight reel to passengers allows passengers to save these memories. This helps create an improved image for a rideshare service, since saving these moments may later remind users of the great time they had in one of the rideshare service's vehicles.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Example Autonomous Vehicle Configured for Creating Highlight Reels

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, to sense and avoid obstacles, and to sense its surroundings. According to various implementations, the autonomous vehicle 110 is part of a fleet of vehicles for picking up passengers and/or packages and driving to selected destinations. The autonomous vehicle 110 is configured for capturing images during a ride and creating a highlight reel of a passenger's ride.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events. In particular, data from the sensor suite 102 can be used to update a map with information used to develop layers with waypoints identifying selected events, the locations of the encountered events, and the frequency with which the events are encountered at the identified location. In some examples, data from the sensor suite 102 can include information about places of interest that can be photogenic opportunities. In some examples, data from the sensor suite 102 can include information regarding crowds and/or lines outside and/or around selected venues. Additionally, sensor suite 102 data can provide localized traffic information. In this way, sensor suite 102 data from many autonomous vehicles can continually provide feedback to the mapping system and the high fidelity map can be updated as more and more information is gathered.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

In some implementations, the sensor suite 102 can be used to capture images during a ride, and the images can be included in a highlight reel for a passenger. In some implementations, the sensor suite 102 can be used to capture one or more images of a passenger or passengers, either as they approach the vehicle, or when the passenger or passengers pose for a photo.

In some implementations, data from the sensor suite 102 can be used to detect a passenger exiting a vehicle and/or to determine that a passenger has exited a vehicle. In some examples, a passenger drop-off determination is satisfied by detecting that a passenger has exited the vehicle. For instance, interior and/or exterior cameras can be used to detect that a passenger has exited the vehicle. In some examples, other interior and/or exterior sensors can be used to detect that a passenger has exited the vehicle.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. Additionally, the cameras can be used to automatically and/or manually capture images of passengers inside the vehicle. In some examples, the autonomous vehicle 110 includes one or more weight sensors inside the vehicle, which can be used to detect items or people inside the vehicle. In some examples, the interior sensors can be used to detect passengers inside the vehicle. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Method for Capturing Images During a Ride

Figure 2:
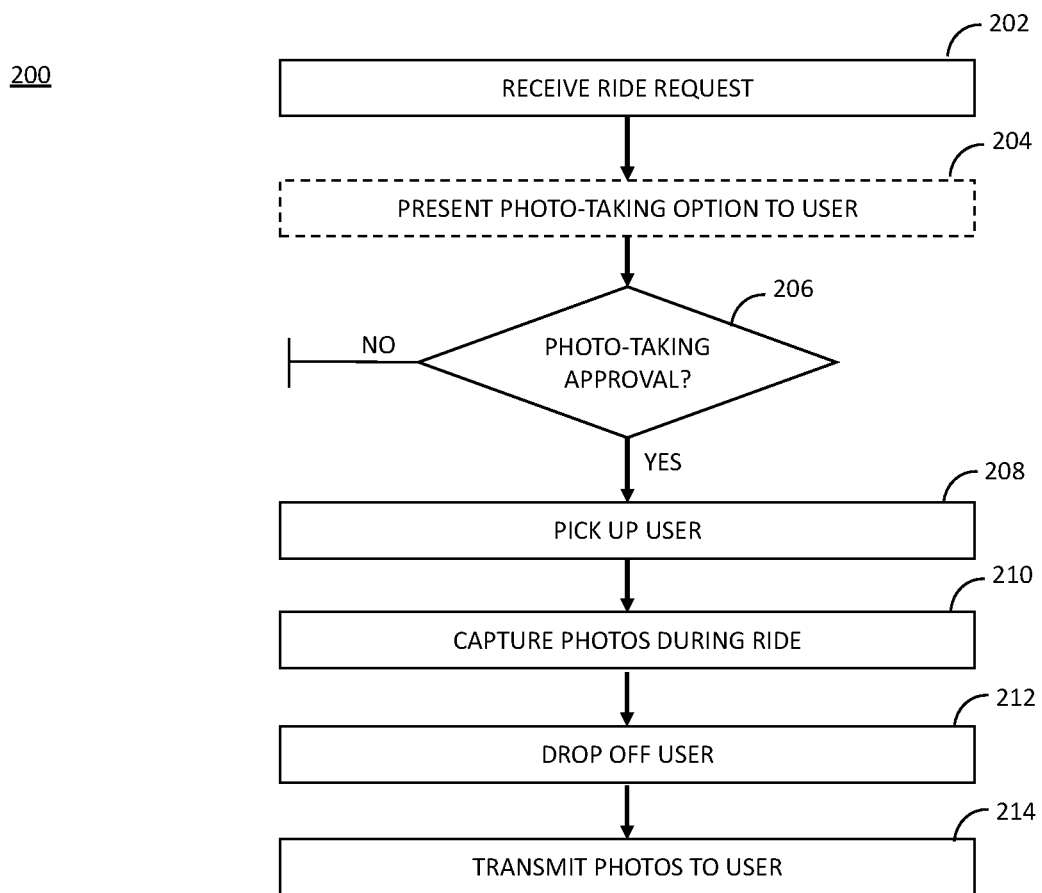
FIG. 2 is a diagram illustrating a method for capturing images during a ride, according to some embodiments of the disclosure.

FIG. 2 is a diagram illustrating a method 200 for capturing images during a ride, according to various embodiments of the disclosure. The images can be captured using a vehicle's sensor suite, and the captured images can be used to create a highlight reel. In some examples, the images include videos and/or short video clips. The highlight reel can then be shared with passengers, for example through the rideshare service application.

At step 202, a ride request is received by the rideshare service. In some examples, when a user creates a rideshare service account, the user can opt in or out of a photo-capturing option. In some examples, at step 204, a photo-capturing option is presented to the user after a ride request is received at step 202. At step 206, the rideshare service determines whether it has received photo-taking approval from a user. If the rideshare service has not received photo-taking approval, the method ends.

At step 208, the user is picked up. In some examples, the ride includes multiple passengers including the user, and multiple passengers are picked up. At step 210, photos are captured during the ride. In some examples, this includes capturing photos during pick-up, such as when a passenger is approaching the vehicle and/or when a passenger stops and poses for a photo before entering the vehicle.

During the ride, images are captured using the cameras located throughout the vehicle. The images can include photos, videos, and video clips. The images can include photos from inside the vehicle as well as photos taken outside the vehicle. Inside the vehicle, in some examples, images are captured automatically based on selected cues, such as group laughter. Sensors inside the vehicle can be used to detect various cues. For example, one or more microphones in the vehicle can be used to detect laughter, and detection of laughter can trigger image-capturing. In some examples, a user can request a photo vocally, and microphones are used to detect the user request. In some examples, a user may elect to be periodically reminded to pose for a photo, e.g., every ten minutes. In general, the image-capturing systems and methods are designed to automatically capture and compile interesting and/or special moments from a rideshare experience.

According to one implementation, images are captured during a passenger's first ride, and in some examples, the images are used to create a highlight reel of the passenger's first autonomous vehicle rideshare experience. Users who have never ridden in an autonomous vehicle may be excited and nervous as they experience their first step into the future of transportation. Images can be captured to create a highlight reel showing the user's reaction to seeing their first autonomous vehicle pull up, the user's nervous laughter as the user drives their first autonomous miles, any interactions or engagement with the in-car tablet and interior, and the end of the user's first trip. These, and other special moments can be captured and stitched into an easily shareable first autonomous vehicle rideshare experience highlight reel. In various examples, the highlight reel is between about 10 seconds and about 60 second long.

In some examples, in addition to in-cabin footage, the highlight reel includes clips from the car's perspective (making maneuvers autonomously, handling traffic, etc.), and interesting ride statistics such as how many autonomous miles the user has driven, how much $CO_2$ the user has conserved, and badges (e.g., First Ride Badge), etc. These and other additional factors can increase interest in the content, thereby increasing the virality of the content and helping to spread awareness of and affection for the autonomous vehicle rideshare service.

In some examples, machine learning is used to identify moments that are worth capturing images of. In one example, the passengers include two friends who are having a great time and laughing hysterically in the cabin. One or more of speech analysis, detection of high decibel levels, and image analysis to detect a smile, can be used to identify the moment as one of interest and trigger in-vehicle cameras to capture one or more images. In some examples, a video recording of the moment is generated. In some examples, moments that are identified and captured include facial reactions when passing beautiful local monuments, particularly "photogenic" moments in the cabin according to photographic standards, deep conversations according to speech analysis patterns, especially bumpy terrain or high speeds, and calendar events. In some examples, a picture and/or video is recorded because the user requests the picture and/or video to be captured.

In some implementations, as discussed in more detail below, the images captured include images from outside the vehicle. In one example, a "replay your ride" feature records a video of the ride, such as a time-lapse video. The video can include a sped up view of the maneuvers the autonomous vehicle made as well as the landmarks the vehicle (and passenger) passed on the way to the destination. Outside the vehicle, a photo can be captured, for example, if the map indicates that the vehicle is at a great photo location.

In some implementations, images are captured at the request of a passenger. This can include a photobooth-like experience that takes advantage of the in-car cameras and tablets to encourage fun social interactions. Riding in an autonomous vehicle is generally a new and interesting experience for many users, so it is likely that users will want to capture and share the experience.

According to some implementations, an app on the tablet in the vehicle allows users to manually take photos and videos of themselves inside the rideshare vehicle cabin. In some examples, users can use a button on a phone or device interface to instruct the in vehicle camera to capture the photo. In some examples, the photo is displayed on the tablet in the vehicle. Users can add filters, custom backgrounds, and use simple editing features to spruce up the generated media.

In some implementations, since the background of the photo (the interior of the vehicle) is known, and the camera's position relative to the vehicle's windows and other structural elements is known, greenscreen effects can be layered into photos to make it look like the user is driving somewhere else, such as on the moon, or in another completely different environment. In some examples, greenscreen effects can be used to remove the background of the vehicle and replace the background with the actual view behind (or next to) the vehicle, as captured using exterior vehicle cameras. Users can also layer on other aspects of the ride to the shareable media, such as ride segments on a 2D or 3D map, images from external sensors, LI DAR points from external sensors, etc.

At step 212, the user is dropped off at the final destination. Additional photos can be captured as the user exits the vehicle, and in some examples, the user can pose for a photo at the destination location. In some examples, a user can use the rideshare app to instruct the autonomous vehicle to capture a photo after exiting the vehicle. Additionally, in some examples, a user can use the rideshare app to trigger the one or more image capture event while the user (and some friends) strike poses for the photos.

At step 214, images captured during the ride are transmitted to the user. In some examples, the images are compiled into a highlight reel and the highlight reel is transmitted to the user. In some examples, the images are saved to a cloud location that is accessible to the user. In some examples, the generated media (i.e., captured images and/or a highlight reel) is stored in a cloud and associated with a user's account, such that the user has access to the media for a select period of time. Users may choose to transfer media to a personal cloud space or to download the media to a personal device. Users may also choose to erase media from the rideshare cloud. In some examples, a code is displayed on a screen in the vehicle that allows passengers to access captured images and/or a highlight reel. In one example, the code is a QR code. In some examples, the user is able to view the captured images and/or highlight reel on the user's rideshare app. In some examples, users can share generated media on various social media channels directly from the rideshare application. For example, users can share media to Facebook, Instagram, Twitter, YouTube, Tiktok, or other social media sites. In some examples, users can send the generated media to others via a messaging or email program.

In some examples, the photos are filtered before being sent to a passenger, to blur or block out other people caught in the pictures and maintain their privacy. In some examples, users have personalized avatars, and users can also place their avatars in the photos/videos, and even interact with the avatars in the photo booth.

In some examples, in the interest of user privacy, the rideshare service automatically deletes all automatically generated videos after a select period of time. In some examples, the autonomous vehicle only captures images for trips when the user explicitly requests a highlight reel.

Figure 3:
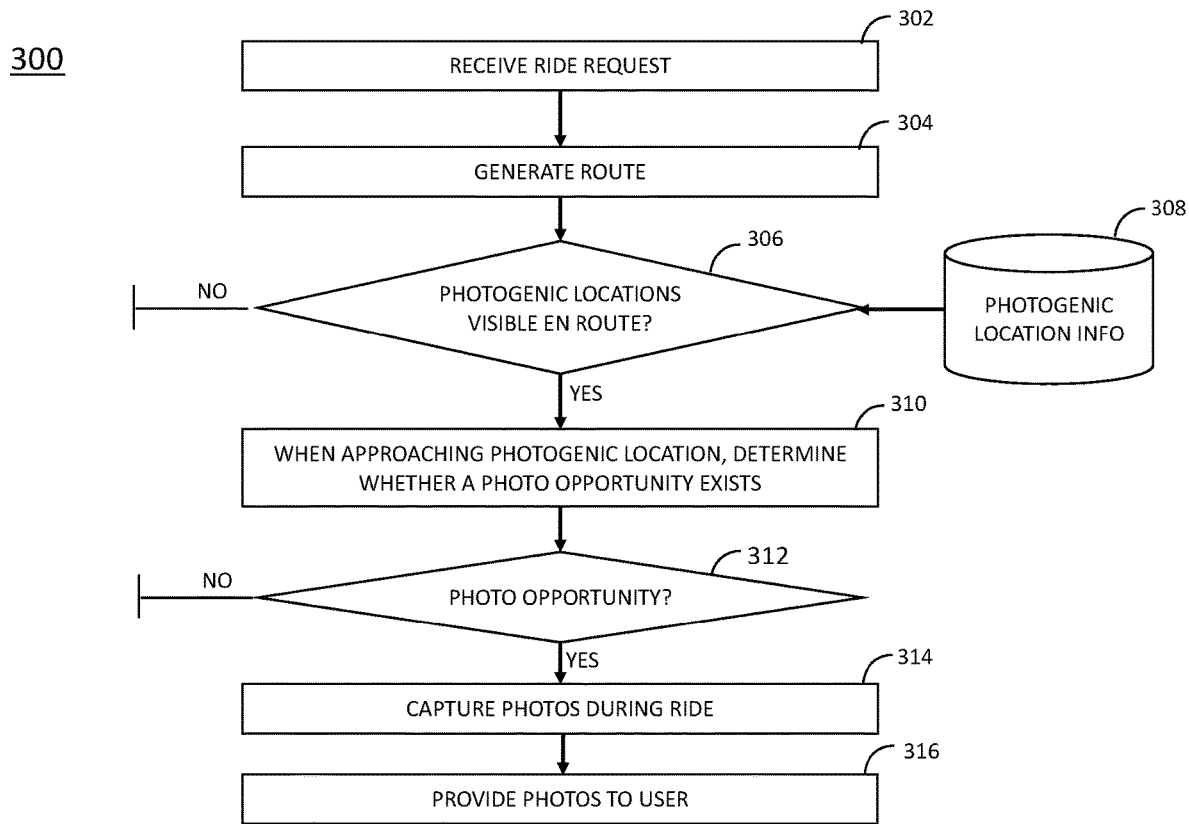
FIG. 3 is a diagram illustrating a method 300 for capturing images of photogenic locations during a ride, according to some embodiments of the disclosure.

FIG. 3 is a diagram illustrating a method 300 for capturing images of photogenic locations during a ride, according to various embodiments of the disclosure. A given route may pass by various photogenic locations, and sensors on the vehicle can capture images of photogenic locations and scenes for passengers. At step 302, a ride request is received. At step 304, a route is generated according to the ride request parameters. Ride request parameters include, for example, pick-up location, pick-up time, drop-off location, number of passengers, and, optionally, intermediate stops. Once the route is generated, at step 306, any photogenic locations along the route are identified. In some examples, a database 308 of photogenic locations can be used to identify photogenic locations along the route.

In general, outside the vehicle, a picture may be captured if the map indicates the vehicle is at a great photo location (such as on a high hill overlooking the city), the weather is clear enough, and vehicle sensors don't indicate that there is an object (such as another vehicle) in the way of the shot. In some examples, image recognition is used to determine if a particular view/shot is acceptable. For example, image recognition can be used for a sunset view to determine whether the view/image includes the sun. In another example, image recognition can be used on an image of a landmark to determine whether the view/image includes the landmark.

Some photogenic locations are stored and include parameters defining when the location is photogenic. For example, if the photogenic location is a location to view a sunset, the location is only photogenic during a certain time period each day, and that time can change throughout the year. Similarly, some locations, such as a location to view a sunset, are only photogenic in certain weather conditions. For example, fog and/or rain may block a view. Thus, there can be weather parameters defining whether a photogenic location is photogenic at a particular day and time. Autonomous vehicle sensors and/or external weather reports can be used to determine weather conditions. Some photogenic locations may be photogenic because of an event, such as a parade, and thus an event calendar may be included as a parameter. Another example of a photogenic location includes cherry blossoms in the spring in some cities. Since the cherry blossoms are only in bloom during certain days and/or weeks of the year, a parameter can include the specific date and/or time of year. In general, parameters defining whether a location is photogenic at a particular time can include time of day, location, time of year, weather conditions, and an event calendar. Other parameters can also be included, and determinations regarding parameters defining photogenic locations can be refined over time.

According to some implementations, live data from a fleet of autonomous vehicles can be leveraged to judge a location's live photogenic quality. In particular, image data from multiple vehicles in a fleet at and/or around a particular location can be analyzed to determine photogenic quality of the location. In various examples, the image data from the vehicles is analyzed as it is collected, allowing for live updates of photogenic quality.

In some examples, maps that a rideshare service uses to generate routes include identified photogenic locations. In some examples, the identified photogenic locations are included in the map when parameters indicate the locations are photogenic. If no photogenic locations are identified along the route, the method 300 ends at step 306. If one or more photogenic locations are identified, the method proceeds to step 310.

At step 310, when an autonomous vehicle approaches a photogenic location, it determines whether a photo opportunity exists at (or near) that location. In some examples, another vehicle may be blocking a view of a photogenic location. In other examples, construction prevents a view of a photogenic location. At step 312, if no photo opportunity exists, the method 300 ends.

At step 312, if there is a photo opportunity, the method proceeds to step 314 and images are captured. In some examples, the vehicle can alert the passengers that they are approaching the photogenic location and to prepare for photos. In some examples, a user can be provided an option for the vehicle to pull over and stop for a photo opportunity. In some examples, a user can request to exit the vehicle for the photo opportunity. In this example, the user can be in a photo captured by the vehicle that includes the view. In other examples, a user can be provided with an option for the vehicle to slow down for a photo opportunity. The vehicle can capture images of the view from the photogenic location, and/or the user can capture images using a personal device.

At step 316, images captured by the autonomous vehicle are provided to the user. In some examples, the images are compiled in a highlight reel. In various examples, the images are provided to the user by allowing the user to download the images, allowing the user to save the images to the user's cloud-space, and/or allowing the user to share the images on social media, such as the user's personal social media.

In some implementations, users sharing images and/or a highlight reel helps build trust in and loyalty to a selected rideshare service. Thus, simple sharing opportunities are embedded into the image capturing options offered by the rideshare service. In one example, when a user shares an image or highlight reel captured by the rideshare service, the rideshare service adds an option to include a rebate code for the user and for the friends. For example, the rideshare service can present an option to the user such as "Refer friends by showing them your first ride and get 20% off!". This is a more personalized and fun way for a user to refer friends and share a rebate than simply sending a code and/or link to a service.

In some implementations, images captured during a ride can be used for advertising purposes. Images can be used to advertise the rideshare service. Additionally, photos and/or videos can be sold to a city in which the autonomous vehicle rideshare service operates to help with tourism.

While images and/or a photo reel can be provided to a user following a single ride, a user can also request a photo reel of rides taken over a selected period of time. For example, if a user is visiting a city on a trip, the user can choose to have a photo reel compiled using images from multiple rides taken during the trip. Thus, the highlight reel can leverage the fact that a user will take multiple rides to stitch together highlights from a period of time.

In some examples, before or following a first ride, a user can request that a rideshare service compile a highlight reel over a selected period of time. In other examples, a user can request compilation of a highlight reel during and/or following the period of time. In one example, at the end of a weeklong trip, a user can request a highlight reel including images from rides taken between a selected start date and a selected end date. In another example, before or during a weeklong trip, a user can request that the rideshare service capture and compile images of rides taken during the trip, and provide a highlight reel at the end of the trip. An advantage of this service is that it incentivizes the user to continue to use the rideshare service for all rides during the trip.

In some examples, the highlight reel can span across multiple cities, providing a user with a curated photo experience from their travels, including the user's reactions to seeing certain sights for the first time (e.g., a photo of the passenger inside the vehicle when the autonomous vehicle passes the Golden Gate Bridge with clear sightlines). In some examples, multiple vehicles can be used, such that if one rideshare vehicle passes another rideshare vehicle, the first rideshare vehicle can take a photo of the second rideshare vehicle. This enables creation of photo and/or video combinations that cannot be using existing methods. In some implementations, a rideshare application allows users to "collect" (and keep track of) landmarks the users have seen while in rideshare vehicles.

In some implementations, the images captured include video shorts or time-lapse videos of maneuvers the autonomous vehicle completes while the passenger is in the vehicle. For example, if a passenger experiences an autonomous vehicle performing a complicated maneuver, the complicated maneuver can be saved to the highlight reel for the passenger's ride. Additionally, passenger reactions to the maneuver can be captured by interior cameras and saved to the highlight reel.

Routing to Photogenic Locations

In some examples, no photogenic locations are identified along the generated route, but other photogenic locations near the route are identified. In these cases, a user can be offered the option to add a detour to one or more identified photogenic locations. In other examples, a user can be offered one or more alternative route options, with the alternative routes including a photogenic location or view. In some examples, one route is photogenic while another route is not. For instance, one route can include a road that runs along the coast with ocean views, while the other route includes a highway with few or no ocean views. A user can select which route the user prefers. In some examples, different routes may have different prices, since some routes are longer than others.

Example Autonomous Vehicle for Capturing Images

Figure 4:
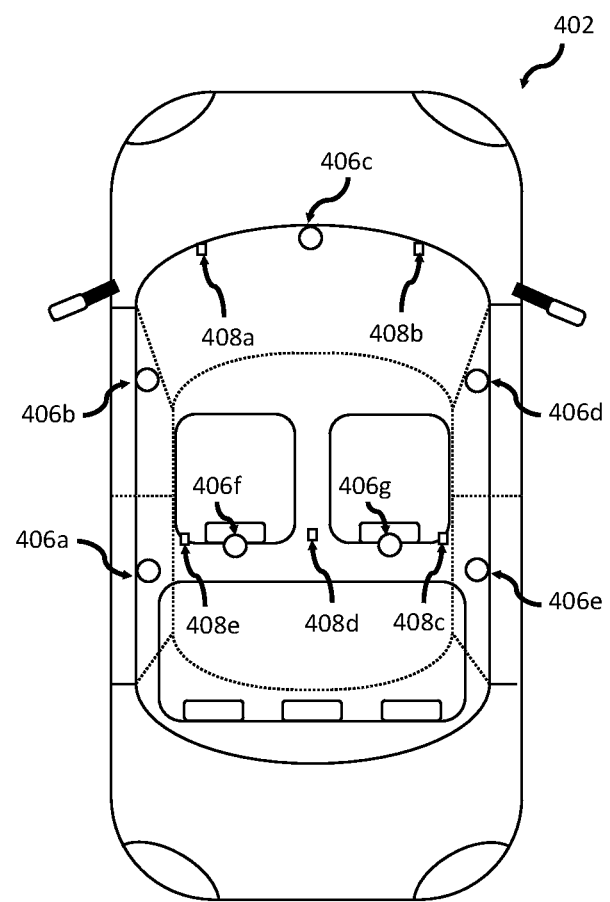
FIG. 4 is a diagram illustrating a top view showing the interior of a vehicle for capturing images during a ride, according to some embodiments of the disclosure.

FIG. 4 is a diagram 400 illustrating a top view showing the interior of a vehicle 402 for capturing images during a ride, according to some embodiments of the disclosure. As shown in FIG. 4, there are multiple cameras 406a, 406b, 406c, 406d, 406e, 406f, 406g located throughout the vehicle. In various examples, a vehicle can include more or fewer cameras. The cameras 406a-406g can be used to capture images of passengers in the vehicle 402. The images can include photos and/or videos. In various implementations, each of the cameras 406a-406g captures a different perspective view of passengers in the vehicle. In some examples, images from one or more cameras 406a-406g can be stitched together, and in some examples, a panoramic view of the interior of the vehicle is generated.

According to various implementations, the vehicle 402 includes additional sensors 408a, 408b, 408c, 408d, 408e for detecting special moments inside the vehicle. In some examples the sensors 408a-408e are microphones and can be used to detect special moments. Audio events recorded by the microphones that can trigger capturing an image can include laughter, giggling, a gasp, a reaction to a landmark, and decibel level of the conversation. In some examples, manual image capturing is triggered by an audio event such as the instruction "Take a photo". In some implementations, a user can choose to record an entire ride, including conversation that occurs inside the vehicle during the ride.

Figure 5:
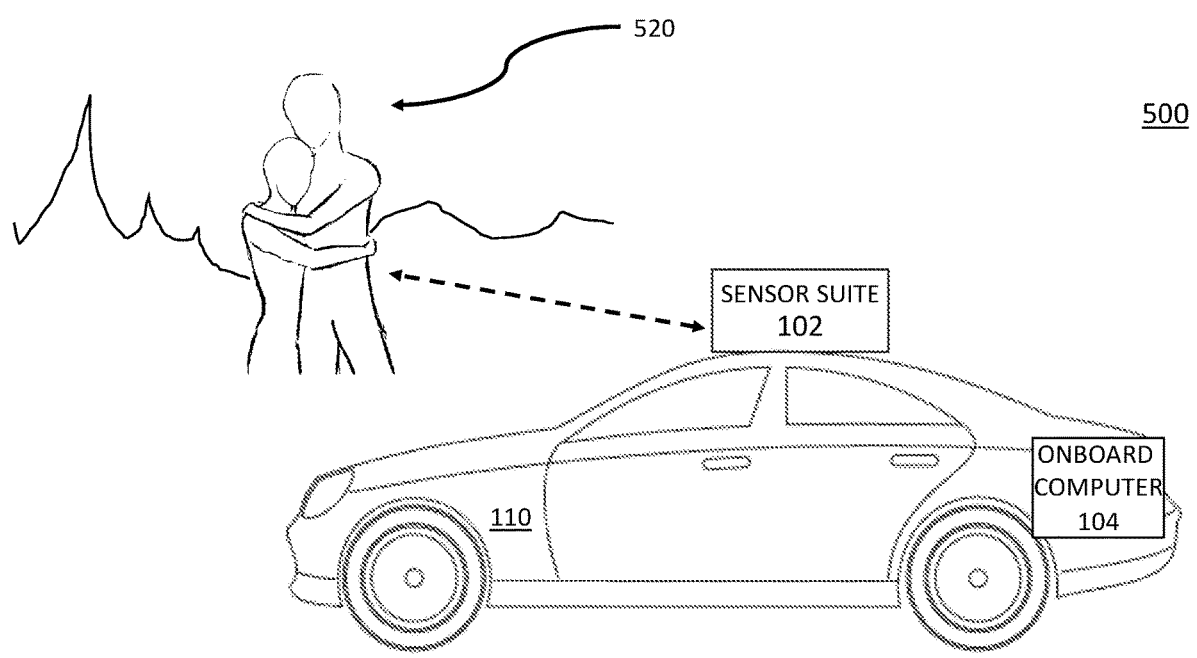
FIG. 5 is a diagram illustrating an autonomous vehicle and passengers posing for a photo, according to various embodiments of the disclosure.

FIG. 5 is a diagram 500 illustrating an autonomous vehicle 110 and two passengers 520 posing for a photo in front of a scenic mountain view, according to various embodiments of the disclosure. According to some examples, the passengers are en route to a destination, and opted to have the autonomous vehicle 110 stop at a photogenic location such that the passengers could get out of the vehicle and pose for a photo. Cameras in the sensor suite 102 on the autonomous vehicle 110 detect the passengers 520 and the view, and capture one or more images of the passengers including the photogenic view. In some examples, the passengers get back in the vehicle after capturing some photos and continue to their next and/or final destination.

Example Device for Receiving and/or Sharing Images

Figure 6A:
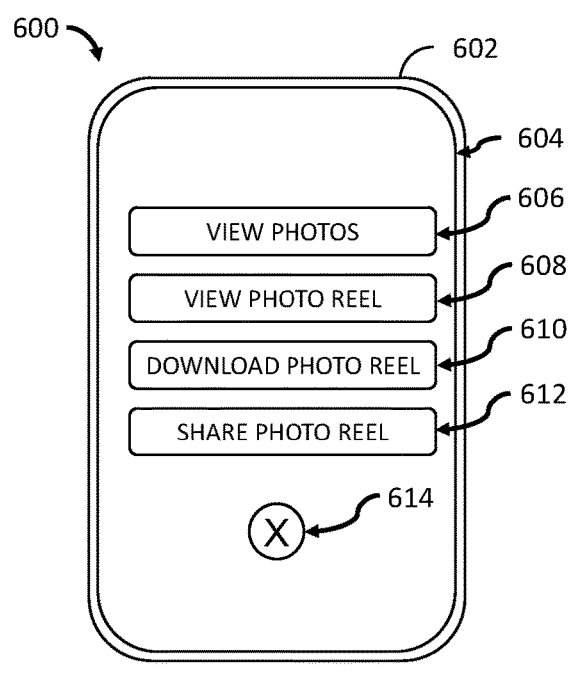
FIGS. 6A and 6B show examples of a device with highlight reel options, according to some embodiments of the disclosure.
Figure 6B:
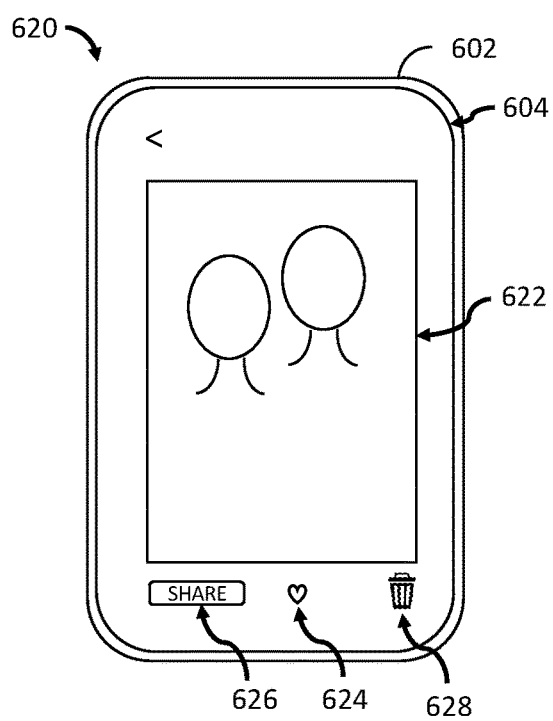

FIGS. 6A and 6B show examples 600, 620 of a device interface for receiving, viewing, and/or sharing captured images, according to some embodiments of the disclosure. In particular, FIG. 6A shows an example 600 of a device 602 showing a rideshare application interface 604 providing the user with four options (buttons) with respect to captured images. In some examples, the interface is displayed during and/or after the ride, and the interface (i.e., the photo reel) can be available for a selected period of time following the end of the ride.

The interface 604 provides a user with five options. The first option is a "View Photos" button 606, the second option is a "View Photo Reel" button 608, the third option is a "Download Photo Reel" button 610, the fourth option is a "Share Photo Reel" button 612, and the fifth option is a close button 614 that closes the photo option interface, returning to a previous rideshare app interface. The first option, the "View Photos" button 606, allows a user to view the captured images. When the "view photos" button 606 is selected, the captured images are displayed individually such that the user can scroll through the images and select favorites.

FIG. 6B shows an example 620 of the device 602 showing a captured image 622. According to various examples, a user can mark an image as a favorite by selecting the heart 624, share an image by selecting the share button 626, and/or delete an image by selecting the trash can 628. A user can scroll through images by swiping the screen to view the various images captured during their ride. If a user chooses to share an image, the user may be presented with multiple sharing options, including sharing the image to a social media site, sharing an image via text or another messaging app, and sharing an image via email.

The second option, the "View Photo Reel" button 608, allows a user to view a highlight reel of captured images. When the "View Photo Reel" button 608 is selected, various ones of the captured images are selected and automatically sequentially displayed in an interface similar to that shown in FIG. 6B. The user has an option to mark the highlight reel as a favorite by selecting the heart icon, share the highlight reel by selecting the share button, or erase the highlight reel by selecting the trash can icon.

The third option, the "Download Photo Reel" button 610, allows a user to download the highlight reel of captured images to a device, download the highlight reel of captured images to a personal cloud storage space, or save the highlight reel of captured images to a rideshare service personal account.

The fourth option, the "Share Photo Reel" button 612, allows a user to share the highlight reel of captured images. When the button 612 is selected, the user is presented with multiple options for sharing the highlight reel. The options can include sharing the highlight reel on a social media site such as Facebook, Instagram, Twitter, and/or YouTube. Further options can include sharing the highlight reel with one or more friends via a messaging app or via email.

Example of Autonomous Vehicle Fleet

Figure 7:
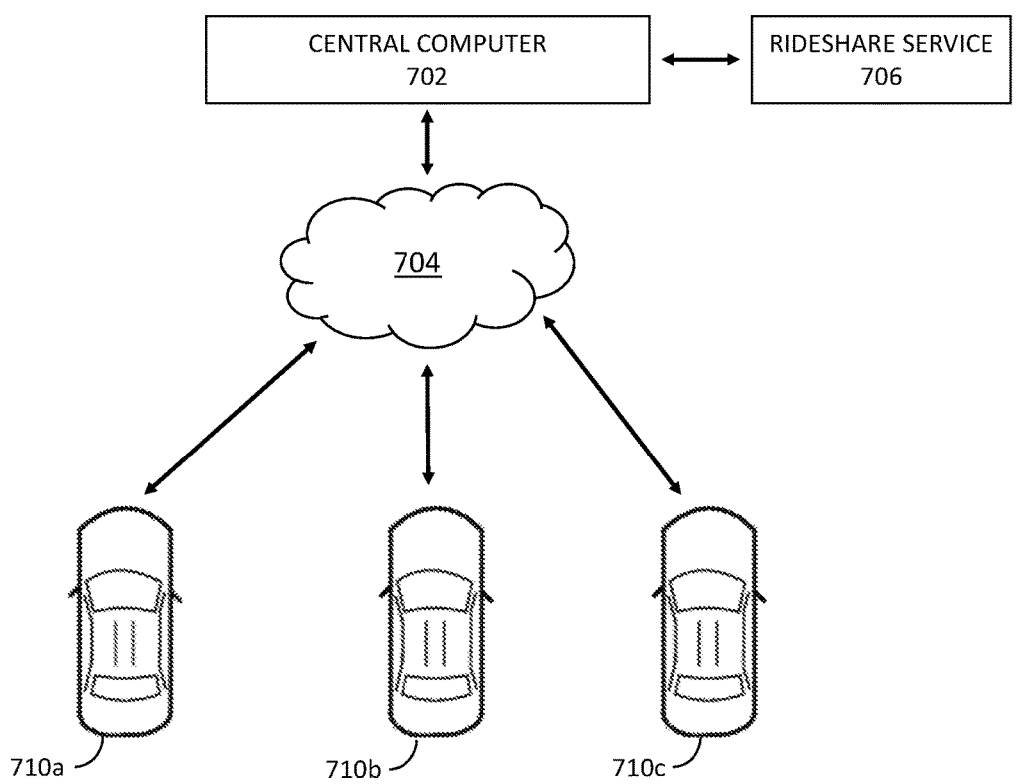
FIG. 7 is a diagram illustrating a fleet of autonomous vehicles in communication with a central computer, according to some embodiments of the disclosure.

FIG. 7 is a diagram 700 illustrating a fleet of autonomous vehicles 710a, 710b, 710c in communication with a central computer 702, according to some embodiments of the disclosure. As shown in FIG. 7, the vehicles 710a-710c communicate wirelessly with a cloud 704 and a central computer 702. The central computer 702 includes a routing coordinator and a database of information from the vehicles 710a-710c in the fleet. Autonomous vehicle fleet routing refers to the routing of multiple vehicles in a fleet. The central computer also acts as a centralized ride management system and communicates with rideshare users via a rideshare service 706. The vehicles 710a-710c can each be used to implement the image capturing methods of FIGS. 2 and 3. In some implementations, the autonomous vehicles 710a-710c communicate directly with each other.

When a passenger requests a ride through a rideshare service 706, the rideshare service 706 sends the request to central computer 702. The central computer 702 selects a vehicle 710a-710c based on the request. When the vehicle 710a-710c picks up the passenger, the vehicle can begin capturing images of the passenger and the ride, as described above with respect to the methods of FIGS. 2 and 3. The vehicle 710a-710c continues to capture images throughout the ride. In some examples, at the end of a ride, the vehicle 710a-710c uploads the images to the cloud 704, where they are saved for a selected period of time. In other examples, at the end of a ride, the vehicle 710a-710c uploads a highlight reel of images to the cloud 704. The vehicles 710a, 710b, 710c communicate with a central computer 702 via a cloud 704.

Once a destination is selected and the user has ordered a vehicle, the routing coordinator can optimize the routes to avoid traffic as well as vehicle occupancy. In some examples, the routing coordinator can provide route options that include one or more photogenic locations as described above. In some examples, an additional passenger can be picked up en route to the destination, and the additional passenger can have a different destination. In various implementations, since the routing coordinator has information on the routes for all the vehicles in the fleet, the routing coordinator can adjust vehicle routes to reduce congestion and increase vehicle occupancy.

As described above, each vehicle 710a-710c in the fleet of vehicles communicates with a routing coordinator. Thus, information gathered by various autonomous vehicles 710a-710c in the fleet can be saved and used to generate information for future routing determinations. For example, sensor data can be used to generate route determination parameters. Additionally, in some examples, a vehicle 710a-710c can identify a photogenic location, and this information can be saved and used for future routing determinations. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals, such as passing a photogenic location. In some examples, the routing coordinator uses collected position data corresponding to emergency events to generate a best route for an autonomous vehicle to avoid a potential emergency situation.

According to various implementations, a set of parameters can be established that determine which metrics are considered (and to what extent) in determining routes or route modifications. For example, expected congestion or traffic based on a known event can be considered. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, safety of the route plan, view from the vehicle of the route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints. As a further example, a routing goal may be that the vehicle pass one or more photogenic locations or take a scenic route as selected by the user.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination. In some implementations, the routing coordinator in the central computing system 702 generates a route for each selected autonomous vehicle 710a-710c, and the routing coordinator determines a route for the autonomous vehicle 710a-710c to travel from the autonomous vehicle's current location to a destination.

Example of a Computing System for Ride Requests

Figure 8:
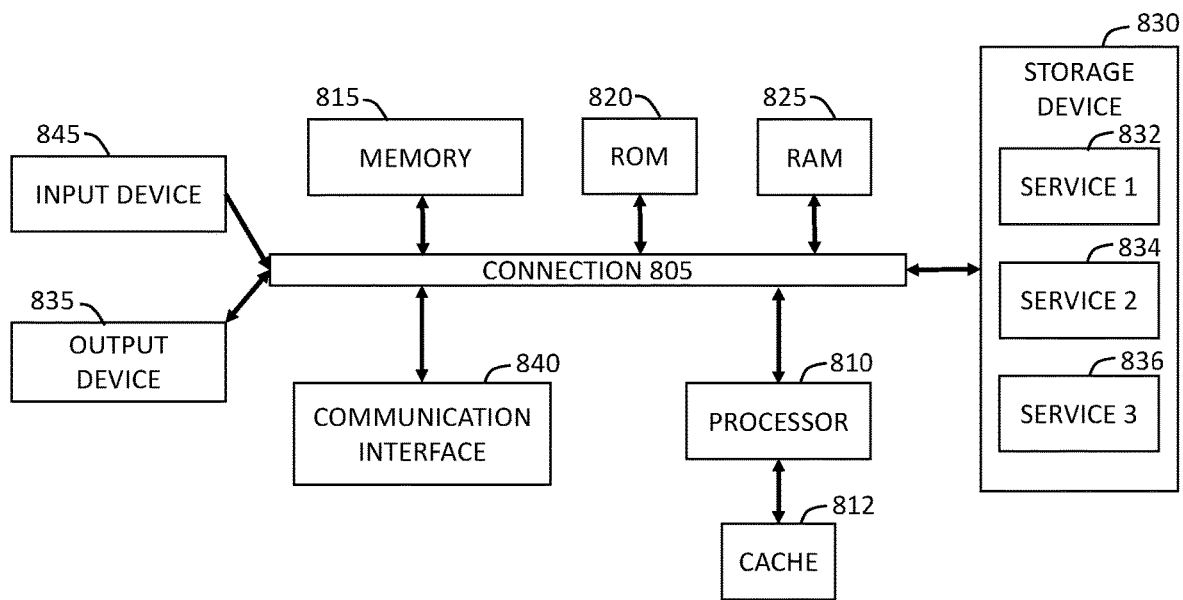
FIG. 8 shows an example embodiment of a system for implementing certain aspects of the present technology.

FIG. 8 shows an example embodiment of a computing system 800 for implementing certain aspects of the present technology. In various examples, the computing system 800 can be any computing device making up the onboard computer 104, the central computing system 702, or any other computing system described herein. The computing system 800 can include any component of a computing system described herein which the components of the system are in communication with each other using connection 805. The connection 805 can be a physical connection via a bus, or a direct connection into processor 810, such as in a chipset architecture. The connection 805 can also be a virtual connection, networked connection, or logical connection.

In some implementations, the computing system 800 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 800 includes at least one processing unit (CPU or processor) 810 and a connection 805 that couples various system components including system memory 815, such as read-only memory (ROM) 820 and random access memory (RAM) 825 to processor 810. The computing system 800 can include a cache of high-speed memory 812 connected directly with, in close proximity to, or integrated as part of the processor 810.

The processor 810 can include any general-purpose processor and a hardware service or software service, such as services 832, 834, and 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction, the computing system 800 includes an input device 845, which can represent any number of input mechanisms, such as a microphone for speech, a touch-sensitive screen for gesture or graphical input, keyboard, mouse, motion input, speech, etc. The computing system 800 can also include an output device 835, which can be one or more of a number of output mechanisms known to those of skill in the art. In some instances, multimodal systems can enable a user to provide multiple types of input/output to communicate with the computing system 800. The computing system 800 can include a communications interface 840, which can generally govern and manage the user input and system output. There is no restriction on operating on any particular hardware arrangement, and therefore the basic features here may easily be substituted for improved hardware or firmware arrangements as they are developed.

A storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as a processor 810, a connection 805, an output device 835, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

SELECT EXAMPLES

Example 1 provides a method for providing images from an autonomous vehicle ride, comprising: receiving a ride request from a user, generating a route based on ride request parameters, determining that the route passes a photogenic location, and identifying the photogenic location, determining whether a photo opportunity exists at the photogenic location, and capturing an image including the photogenic location when the vehicle drives by the photogenic location.

Example 2 provides a method according to one or more of the preceding and/or following examples, further comprising determining whether the route passes nearby any photogenic locations and presenting the user with an option to take a detour to a nearby photogenic location.

Example 3 provides a method according to one or more of the preceding and/or following examples, wherein capturing the image further comprises stopping at the photogenic location.

Example 4 provides a method according to one or more of the preceding and/or following examples, wherein capturing the image further comprises photographing the user at the photogenic location.

Example 5 provides a method according to one or more of the preceding and/or following examples, further comprising capturing a first user image inside the vehicle during the ride.

Example 6 provides a method according to one or more of the preceding and/or following examples, further comprising providing the image to the user via a rideshare application.

Example 7 provides a method according to one or more of the preceding and/or following examples, further comprising allowing the user to share the image via at least one of a social network and a messaging service.

Example 8 provides a method according to one or more of the preceding and/or following examples, wherein capturing an image includes capturing a plurality of images and further comprising selecting a subset of the plurality of images and generating a highlight reel of the ride including the subset.

Example 9 provides a method according to one or more of the preceding and/or following examples, wherein generating a route includes generating a plurality of routes and further comprising presenting the plurality of routes to the user and receiving a respective route selection from the plurality of routes.

Example 10 provides an autonomous vehicle for providing images from an autonomous vehicle ride, comprising: an onboard computer configured to receive a route including a photogenic location; a sensor suite on the vehicle configured to capture a first set of images along the route, wherein the first set of images include the images of the photogenic location; and a plurality of sensors inside the vehicle, wherein at least one of the sensors is configured to capture a second set of images during the ride, wherein the second set of images include views inside the vehicle at the photogenic location.

Example 11 provides an autonomous vehicle according to one or more of the preceding and/or following examples, wherein the onboard computer is further configured to determine whether a photo opportunity exists at the photogenic location, based on data from the sensor suite.

Example 12 provides an autonomous vehicle according to one or more of the preceding and/or following examples, further comprising a screen configured to display ones of the first and second sets of images during the ride.

Example 13 provides an autonomous vehicle according to one or more of the preceding and/or following examples, wherein the screen is further configured to display a machine-readable code, wherein the machine-readable code is configured to link to the first and second sets of images.

Example 14 provides an autonomous vehicle according to one or more of the preceding and/or following examples, further comprising a transmitter configured to transmit the first and second sets of images to a remote computer system.

Example 15 provides an autonomous vehicle according to one or more of the preceding and/or following examples, wherein the plurality of sensors inside the vehicle includes a microphone configured to record an audio clip corresponding to a respective image from one of the first and second sets of images.

Example 16 provides an autonomous vehicle according to one or more of the preceding and/or following examples, wherein at least one image from the first and second sets of images is a video clip.

Example 17 provides a system for capturing images during an autonomous vehicle ride, comprising: a central computing system configured to receive a ride request, generate a route, and identify a photogenic location along the route; and an autonomous vehicle having a sensor suite configured to capture a first set of images during the ride, wherein the first set of images include images of the photogenic location; wherein the central computing system is further configured to receive the first set of images and link the first set of images with a user account.

Example 18 provides a system according to one or more of the preceding and/or following examples, further comprising a database of photogenic locations, wherein the central computing system is configured to use the database to identify photogenic locations along the route.

Example 19 provides a system according to one or more of the preceding and/or following examples, further comprising a map including a map layer with photogenic locations from the database.

Example 20 provides a system according to one or more of the preceding and/or following examples, wherein the autonomous vehicle is further configured to identify a new photogenic location, and transmit the new photogenic location to the central computing system, and wherein the central computing system is configured to update the database with the new photogenic location.

Example 21 provides a method for providing images from an autonomous vehicle ride, comprising: receiving a ride request from a user; generating a plurality of routes based on ride request parameters, wherein a first route of the plurality of routes passes a first photogenic location; receiving a user request for the first route; and capturing an image including the photogenic location when the vehicle drives by the photogenic location.

Example 22 provides a method according to one or more of the preceding and/or following examples, further comprising determining whether the route passes nearby any other photogenic locations and presenting the user with an option to take a detour to a nearby photogenic location.

Example 23 provides a method according to one or more of the preceding and/or following examples, wherein a second route of the plurality of routes passes a second photogenic location and further comprising transmitting at least two route options to the user, wherein the route options include the first route and the first photogenic location and the second route and the second photogenic location.

Example 24 provides a method for updating map information, comprising: collecting data from a plurality of autonomous vehicles, wherein the data includes a first set of photogenic locations; transmitting the data to a central computing system, wherein the central computing system includes a map and a database of photogenic locations; and generating a first layer of the map including the data.

Example 25 provides a method for providing photos from an autonomous vehicle ride, comprising receiving approval for capturing images of a passenger; capturing a plurality of images during the ride, wherein the plurality of images includes at least one image of the passenger inside the vehicle; and transmitting at least a subset of the plurality of images to the passenger.

Example 26 provides a method according to one or more of the preceding and/or following examples, further comprising selecting a subset of the plurality of images and generating a highlight reel of the ride including the subset.

Example 27 wherein transmitting the includes transmitting the highlight reel to at least one of a passenger data storage, a message address, and a social media site.

Example 28 provides a method according to one or more of the preceding and/or following examples, further comprising providing a rebate code for new users with the highlight reel.

Example 29 provides a method according to one or more of the preceding and/or following examples, further comprising capturing a second set of images during a second ride and wherein generating the highlight reel includes selecting a second subset of images from the second set of images for the highlight reel.

Example 30 provides a method according to one or more of the preceding and/or following examples, further comprising detecting an audio cue inside the vehicle and, based on the audio cue, automatically capturing a first image including the passenger.

Example 31 provides a method according to one or more of the preceding and/or following examples, wherein the audio cue includes at least one of laughter and an exclamation.

Example 32 provides a method according to one or more of the preceding and/or following examples, further comprising receiving a passenger request for a photo, wherein the passenger request includes at least one of a verbal request and a selection on an in-vehicle tablet.

Example 33 provides a method according to one or more of the preceding and/or following examples, wherein capturing the plurality of images includes capturing at least one image of a view outside the vehicle.

Example 34 provides a method according to one or more of the preceding and/or following examples, wherein at least one image of the view outside the vehicle includes the passenger.

Example 35 provides an autonomous vehicle for capturing images during an autonomous vehicle ride, comprising a sensor suite on the vehicle configured to capture a first set of images during the ride, wherein the first set of images include views outside the vehicle, and a plurality of sensors inside the vehicle, wherein at least one of the sensors is configured to capture a second set of images during the ride, wherein the second set of images include views inside the vehicle; and an onboard computer configured to create a highlight reel including a subset of the first set of images and a subset of the second set of images.

Example 36 provides an autonomous vehicle according to one or more of the preceding and/or following examples, further comprising a transmitter configured to transmit the highlight reel to a remote computer system.

Example 37 provides an autonomous vehicle according to one or more of the preceding and/or following examples, further comprising a screen configured to display ones of the first and second sets of images during the ride.

Example 38 provides an autonomous vehicle according to one or more of the preceding and/or following examples, wherein the screen is further configured to display a machine-readable code, wherein the machine-readable code is configured to link to the highlight reel.

Example 39 provides an autonomous vehicle according to one or more of the preceding and/or following examples, wherein the plurality of sensors inside the vehicle includes a microphone configured to detect an audio cue, and wherein the audio cue triggers an image capture event.

Example 40 provides an autonomous vehicle according to one or more of the preceding and/or following examples, wherein the plurality of sensors inside the vehicle includes a microphone configured to record an audio clip corresponding to a respective image from one of the first and second sets of images.

Example 41 provides an autonomous vehicle according to one or more of the preceding and/or following examples, wherein at least one image from the first and second sets of images is a video clip.

Example 42 provides a system for capturing images during an autonomous vehicle ride, comprising: a first autonomous vehicle including a sensor suite on the vehicle configured to capture a first set of images during the ride, wherein the first set of images include views outside the vehicle; a plurality of sensors inside the vehicle, wherein at least one of the sensors is configured to capture a second set of images during the ride, wherein the second set of images include views inside the vehicle; and a central computing system configured to receive the first and second sets of images and link the images with a user account.

Example 43 provides a system according to one or more of the preceding and/or following examples, wherein the central computing system is configured to create a highlight reel including at least one of a first subset of images from the first set of images and a second subset of images from the second set of images.

Example 44 provides a system according to one or more of the preceding and/or following examples, wherein the central computing system is configured to communicate with a user device via a rideshare application, and wherein the first and second sets of images are viewable on the user device via the rideshare application.

Example 45 provides a system according to one or more of the preceding and/or following examples, wherein the central computing system is configured to transmit respective images from the first and second sets of images to a social media platform upon receiving a user request to share the respective images.

Example 46 provides a system according to one or more of the preceding and/or following examples, further comprising a second autonomous vehicle, wherein the second autonomous vehicle is configured to capture an image of the first autonomous vehicle.

Example 47 provides a system according to one or more of the preceding and/or following examples, wherein at least one respective image from the first and second sets of images includes a video.

Example 48 provides a system according to one or more of the preceding and/or following examples, wherein a subset of the first set of images shows an autonomous vehicle maneuver.

Example 49 provides a system according to one or more of the preceding and/or following examples, wherein a respective image of the first set of images shows a landmark.

Example 50 provides a system according to one or more of the preceding and/or following examples, further comprising a second autonomous vehicle configured to capture a third set of images during a second ride, and wherein the central computing system is configured to receive the third set of images and create a highlight reel including images from the first, second, and third sets of images.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for providing images from an autonomous vehicle during an autonomous vehicle ride, comprising:
   receiving a ride request from a user;
   generating a route for the autonomous vehicle based on ride request parameters;
   determining that the route passes a photogenic location, and identifying the photogenic location, wherein identifying the photogenic location includes identifying parameters defining the photogenic location, wherein the parameters include weather conditions and time of day;
   controlling the autonomous vehicle, by a vehicle onboard computer, to drive to the photogenic location;
   determining, by the vehicle onboard computer based on vehicle sensor data, that a photo opportunity exists at the photogenic location, wherein determining that the photo opportunity exists includes determining the photogenic location is visible;
   controlling the autonomous vehicle, by the vehicle onboard computer, to stop the autonomous vehicle at the photogenic location;
   receiving, at the vehicle onboard computer, an exit request from the user to exit the autonomous vehicle;
   capturing, with an autonomous vehicle camera, an image including the photogenic location and the user;
   allowing the user to re-enter the autonomous vehicle; and
   continuing the autonomous vehicle ride, including controlling the autonomous vehicle to drive to a destination.

2. The method of claim 1, further comprising determining, at a central computing system using a database of additional photogenic locations, whether the route passes nearby any additional photogenic locations and presenting on a rideshare application on a user mobile device an option to take a detour to a nearby photogenic location.

3. The method of claim 1, wherein the image is a first image and further comprising capturing a second image inside the vehicle during the autonomous vehicle ride, wherein the second image includes the user.

4. The method of claim 1, further comprising providing the image to the user via a rideshare application.

5. The method of claim 4, further comprising allowing the user to share the image via at least one of a social network and a messaging service.

6. The method of claim 1, wherein capturing the image includes capturing a plurality of images and further comprising selecting a subset of the plurality of images and generating a highlight reel of the ride including the subset.

7. The method of claim 1, wherein generating the route includes generating a plurality of routes and further comprising presenting the plurality of routes to the user via a rideshare application and receiving a respective route selection of the plurality of routes.

8. An autonomous vehicle for providing images from an autonomous vehicle ride, comprising:
an onboard computer configured to:
receive a route including a photogenic location,
identify parameters defining the photogenic location, wherein the parameters include weather conditions and time of day,
control the autonomous vehicle to drive to the photogenic location,
determine, based on vehicle sensor data, whether a photo opportunity exists at the photogenic location, including determining the photogenic location is visible,
control the autonomous vehicle to stop the autonomous vehicle at the photogenic location, and
receive an exit request from a passenger to exit the autonomous vehicle;
a sensor suite on the autonomous vehicle configured to:
generate the vehicle sensor data, and
capture a first set of images along the route, wherein the first set of images include images of the passenger at the photogenic location; and
a plurality of sensors inside the vehicle, wherein at least one of the plurality of sensors is configured to capture a second set of images during the autonomous vehicle ride, wherein the second set of images include views of the passenger inside the vehicle at the photogenic location.

9. The autonomous vehicle of claim 8, further comprising a screen configured to display ones of the first and second sets of images during the ride.

10. The autonomous vehicle of claim 9 wherein the screen is further configured to display a machine-readable code, wherein the machine-readable code is configured to link to the first and second sets of images and wherein the machine-readable code is configured to provide access to the first and second sets of images to a passenger mobile device.

11. The autonomous vehicle of claim 8, further comprising a transmitter configured to transmit the first and second sets of images to a remote computer system.

12. The autonomous vehicle of claim 8, wherein the plurality of sensors inside the vehicle includes a microphone configured to record an audio clip corresponding to a respective image from one of the first and second sets of images.

13. The autonomous vehicle of claim 8, wherein at least one image from the first and second sets of images is a video clip.

14. A system for capturing images during an autonomous vehicle ride, comprising:
a central computing system configured to:
receive a ride request from a user ridehail account,
generate a route based on ride request parameters, and
identify a photogenic location along the route including identifying parameters defining the photogenic location, wherein the parameters include weather conditions and time of day; and
an autonomous vehicle having
an onboard computer configured to
control the autonomous vehicle to stop the autonomous vehicle at the photogenic location, and
receive an exit request from a passenger to exit the autonomous vehicle; and
a sensor suite configured to:
capture a first set of images during the autonomous vehicle ride, wherein the first set of images include images of the passenger at the photogenic location;
wherein the central computing system is further configured to receive the first set of images and link the first set of images with the user ridehail account.

15. The system of claim 14, further comprising a database of photogenic locations, wherein the central computing system is configured to use the database to identify photogenic locations along the route.

16. The system of claim 15, further comprising a map including a map layer with photogenic locations from the database.

17. The system of claim 15, wherein the autonomous vehicle is further configured to identify a new photogenic location, and transmit the new photogenic location to the central computing system, and wherein the central computing system is configured to update the database with the new photogenic location.

18. The method of claim 1, wherein identifying parameters defining the photogenic location, includes identifying a time of year the photogenic location is photogenic.

19. The method of claim 1, wherein identifying parameters defining the photogenic location, includes accessing an event calendar and identifying a scheduled time and a scheduled location for a selected event.

20. The method of claim 3, further comprising identifying, based on interior vehicle sensor data from at least one interior vehicle microphone and at least one interior vehicle camera, user laughter, and capturing the second image based on identifying the user laughter.

* * * * *